Dec. 14, 1948.  W. B. BURKE  2,456,245
MACHINE FOR DRILLING CAPSTAN HEAD SCREWS
Filed Jan. 6, 1943  4 Sheets-Sheet 2

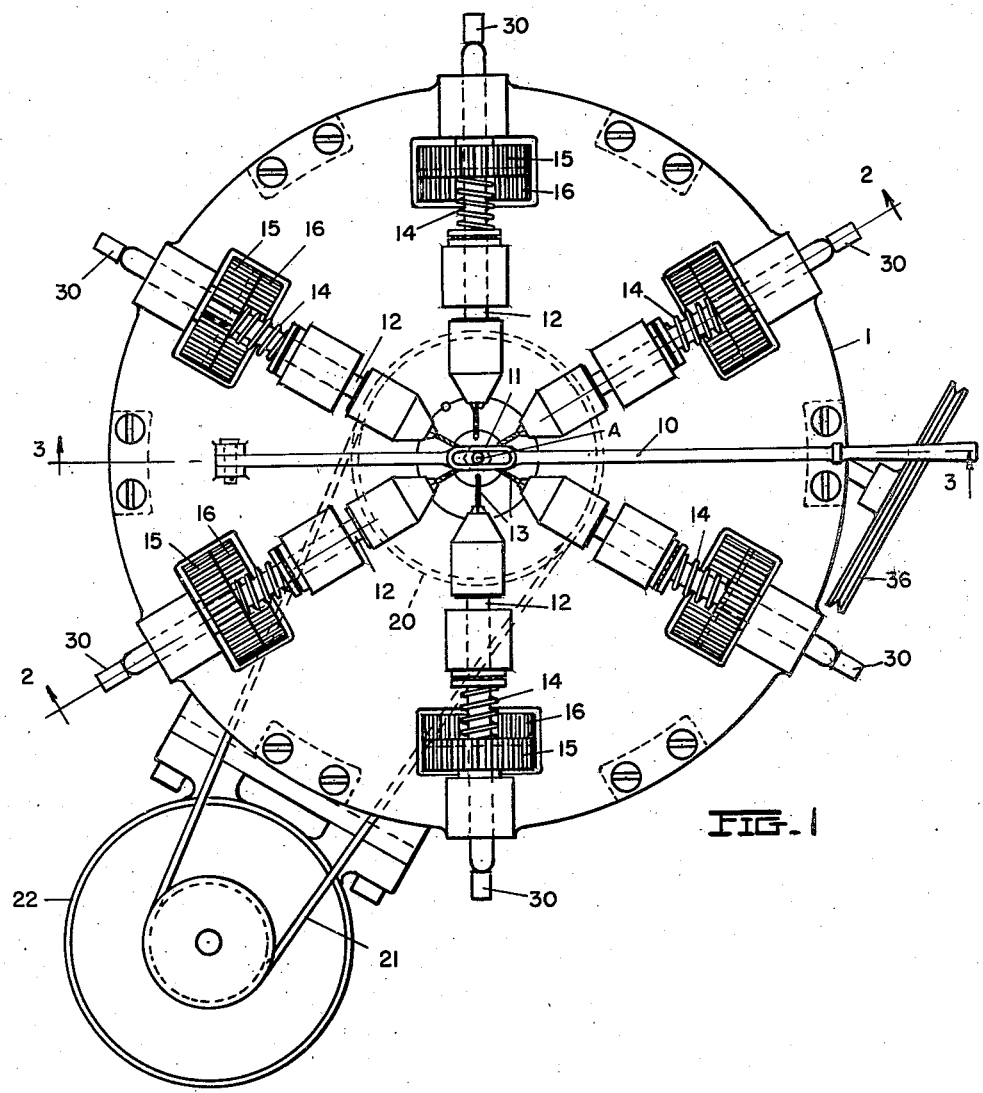
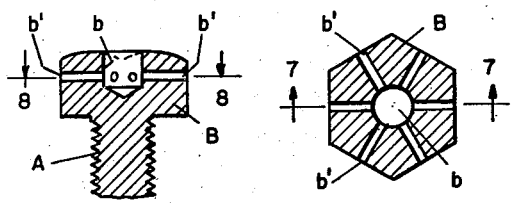

INVENTOR.
WILBUR B. BURKE
BY Oberlin, Limbach & Day
ATTORNEYS

Dec. 14, 1948.  W. B. BURKE  2,456,245
MACHINE FOR DRILLING CAPSTAN HEAD SCREWS
Filed Jan. 6, 1943  4 Sheets-Sheet 3
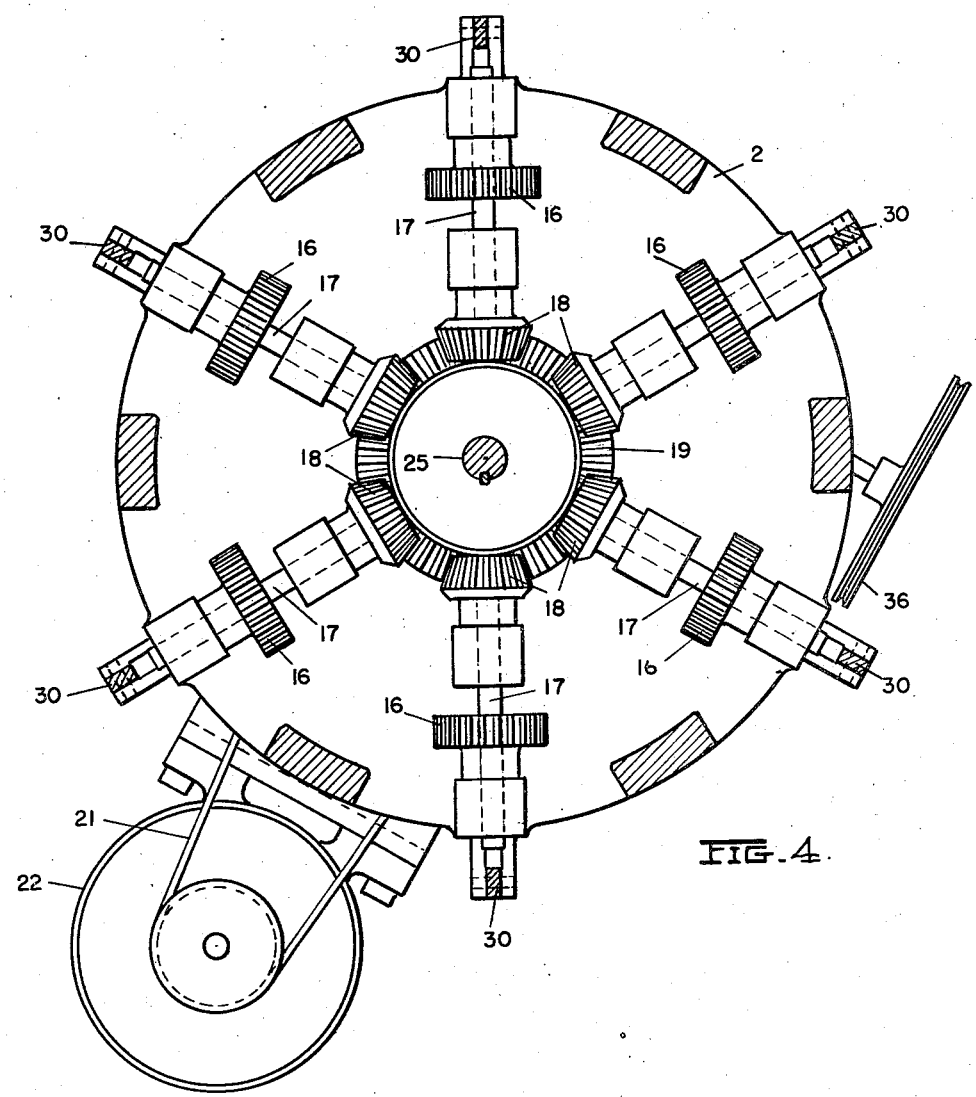
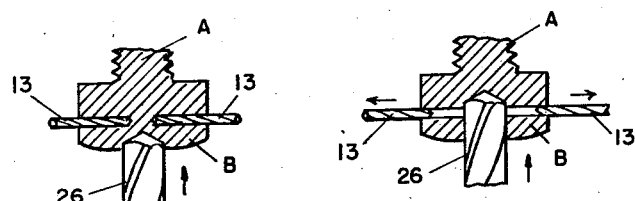
INVENTOR.
WILBUR B. BURKE
BY Oberlin, Limbach & Day.
ATTORNEYS Dec. 14, 1948.　　　　　W. B. BURKE　　　　　2,456,245
MACHINE FOR DRILLING CAPSTAN HEAD SCREWS
Filed Jan. 6, 1943　　　　　　　　　　　　　　4 Sheets-Sheet 4

INVENTOR.
WILBUR B. BURKE
BY Oberlin, Limbach & Day
ATTORNEYS

Patented Dec. 14, 1948

2,456,245

UNITED STATES PATENT OFFICE 2,456,245

MACHINE FOR DRILLING CAPSTAN HEAD SCREWS

Wilbur B. Burke, East Cleveland, Ohio

Application January 6, 1943, Serial No. 471,506

4 Claims. (Cl. 77—26)

The present improvements relate as indicated to the manufacture of capstan head screws and the like, which are characterized by having a series of transverse holes in the head, through which a wire or like securing means may be passed in order to hold the screw against rotation when in place. Such screws ordinarily have hexagonal heads and the transverse holes would intersect at the center; however, owing to the difficulty of drilling such holes clear through the head it has been the practice to drill a central hole axially in the end of the head and then drill a radial hole in each of the sides so as to intersect such central hole. Accordingly, to complete such capstan head seven drilling operations are necessary, which, even though the parts be light, presents a serious manufacturing problem when large numbers are involved.

The object of the present invention is to provide both an improved procedure and necessary mechanism for carrying out the same whereby both such axial and plural radial holes may be drilled simultaneously and the manufacture of these capstan heads greatly facilitated and the cost correspondingly reduced. At the same time by introducing a new sequence in the operations I substantially avoid the formation of any burrs in the holes which are highly objectionable since if they project exteriorly of the head they interfere with the application of a wrench, and if they project interiorly into such axial hole they have to be removed or otherwise they would interfere with the passage of a wire through the radial holes.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawings:

Fig. 1 is a plan view of my improved machine as designed for making capstan head screws;

Fig. 4 is a horizontal sectional view looking downwardly, as indicated by the line 4—4, Fig. 2;

Figs. 7 and 8 are respectively a central section and a transverse section of a capstan head screw, such as my improved machine is adapted to manufacture;

Figs. 9 and 10 illustrate such head at two different stages in the operation of the machine.

Figure 2:
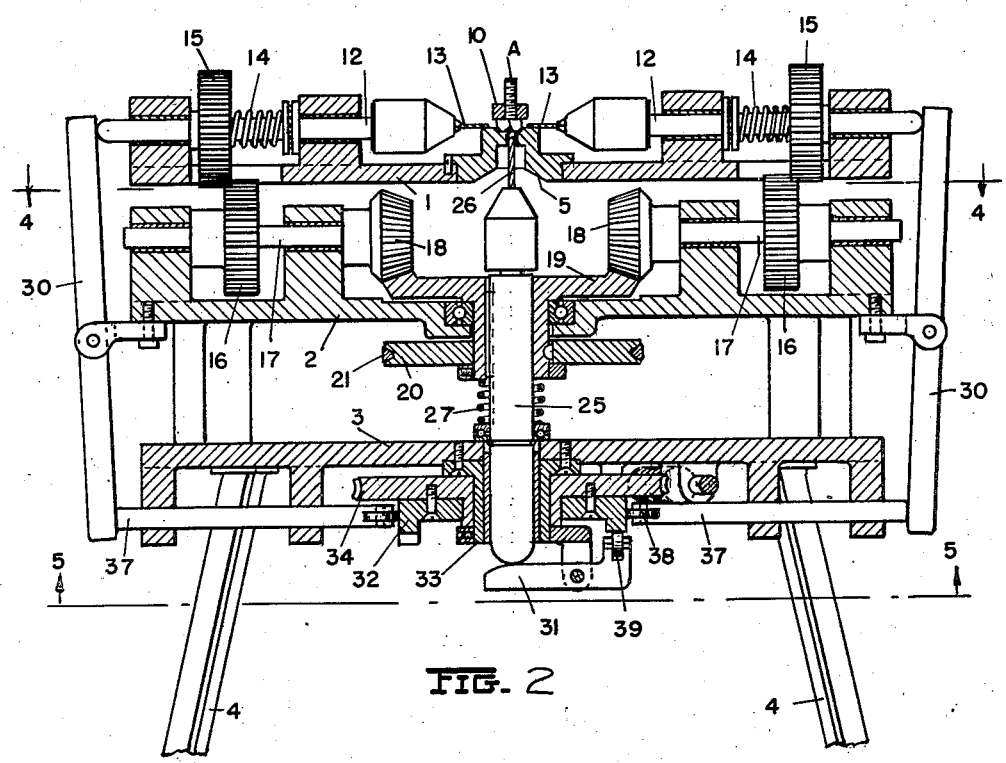
Fig. 2 is a central vertical section thereof taken on the plane indicated by the line 2—2, Fig. 1.

As illustrated in Figs. 7 and 8, the capstan head screw A, which is typical of the articles which my improved machine is designed to make, has a hexagonal head B. In the end of the latter there is drilled an axial hole $b$, and centrally of each of the six faces there is drilled a radial hole $b'$, which at their inner ends intersect such axial hole. These radial holes are of proper diameter to receive the wire or equivalent retaining means and those which enter from opposite faces of the head require to be accurately aligned so that such wire may freely pass diametrically through the head. The axial opening $b$ will desirably be of substantially larger diameter than these radial holes, not only to facilitate the insertion of the securing wire, but for other reasons which will be explained later.

Referring to the illustrative mechanism shown in the drawings, the main frame of the machine will be seen to comprise three vertically spaced plates 1, 2 and 3 of generally circular form which are suitably supported one upon the other, the lowermost being provided with legs 4 so that the machine as a whole may be raised to desired level above the floor on which it rests.

Figure 3:
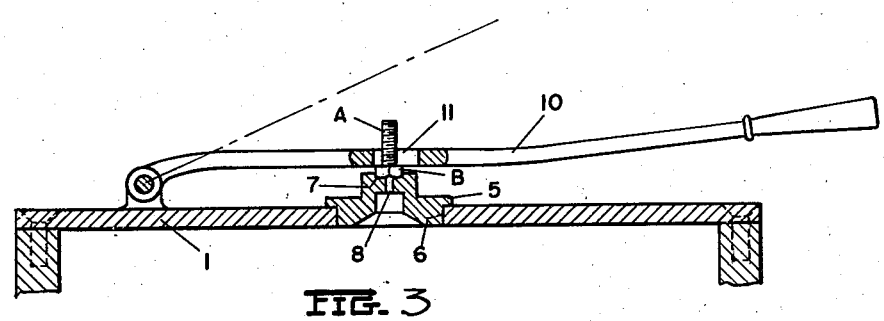
Fig. 3 is a similar central section but showing only the means provided for receiving and holding in fixed position the screw to be drilled, the plane of the section being indicated by the line 3—3, Fig. 1.

Centrally secured in the upper plate 1 is a chucking member 5 for receiving and holding the work-piece, e. g. capstan head screw, while it is being operated on. This member is in the form of a flanged bushing that is adapted to be seated and non-rotatably held in an opening 6 in such plate and that is formed in its upper face with a shallow recess 7 which in the case of a capstan head screw, such as illustrated in Figs. 7 and 8, will be of proper shape and dimensions to closely fit the end of the head while leaving the major portion of its side faces exposed. The bushing is also formed with a central opening 8 through which a drill may enter such recess and thus engage the end of the head as will be presently described. In order to retain the screw in place a handled lever 10 is utilized (see Fig. 3) which is pivotally attached at one end to plate 1 at a point some distance removed from the bushing 5, such lever being formed in its intermediate portion with an elongated slot 11 which will pass freely over a nut with its head in recess 7 and yet permit the lever on each side of the slot to engage and press down against the under face of the head.

Supported in suitable bearings on the top of plate 1 are six radially disposed drill spindles 12 of conventional design, each of which is provided with a drill 13 suitable for drilling one of the radial apertures b' in the head b of the screw. These spindles are equidistantly spaced and so related to the work-piece when positioned in the chucking member 5 as to be aligned centrally with one of the faces of such head. These spindles are movable toward and from the work-piece in their respective bearings and are normally held in retracted position by suitable springs 14, but may be advanced simultaneously through the actuating mechanism which will be described later.

Each such spindle 12 is driven through the medium of a spur pinion 15 thereon which meshes with a corresponding pinion 16 on a countershaft or spindle 17 mounted in suitable bearings directly therebeneath on plate 2 of the main frame of the machine. The disposition and width of these pinions 15 and 16 is such that they will remain at all times in mesh with each other, irrespective of the reciprocating movement of drill-carrying spindles 12. Spindles 17 are in turn driven by means of bevel pinions 18 on their respective inner ends which mesh with a hollow bevel gear 19 which is rotatably mounted in said plate 2 directly beneath the work holding member or bushing 5 and axially aligned with the recess in said member wherein the work-piece is held. The hub of bevel gear 19 projects downwardly below supporting plate 2 and is provided with a sheave 20 to which driving power is applied by means of a belt 21 from a motor 22 mounted alongside the machine frame.

Reciprocably mounted in the bore of bevel gear 19 is a spindle 25 which carries at its upper end a drill 26 designed to drill the central opening b in the end of the head of the screw being operated on. This spindle, just as in the case of the radial drill-carrying spindles 12, is normally retained in retracted position by means of a spring 27 but may be advanced, i. e. raised vertically, to bring the drill 26 into engagement with the head of a screw clamped in the member 5, as previously described.

From the description thus far given of the machine, it will be seen that upon applying power to sheave 20, rotative movement will be simultaneously imparted to such axially aligned drill-carrying spindle 25 and to the series of radially disposed drill-carrying spindles 12 mounted on the top plate of the machine frame.

The means provided for advancing radial drill-carrying spindles 12 inwardly into engagement with the work comprise a corresponding series of rocker arms 30 which are pivotally attached at their mid points to plate 2 of the machine frame and which bear at their upper ends respectively on the outer ends of said spindles, the latter projecting a suitable distance through the adjacent bearing of the spindle, as shown in Fig. 2. Another rocker arm 31 is pivotally attached at an intermediate point to the under side of the lower plate 3 of the machine frame, the inner end of such arm bearing against the lower end of the vertically disposed drill-carrying spindle 25.

Figure 5:
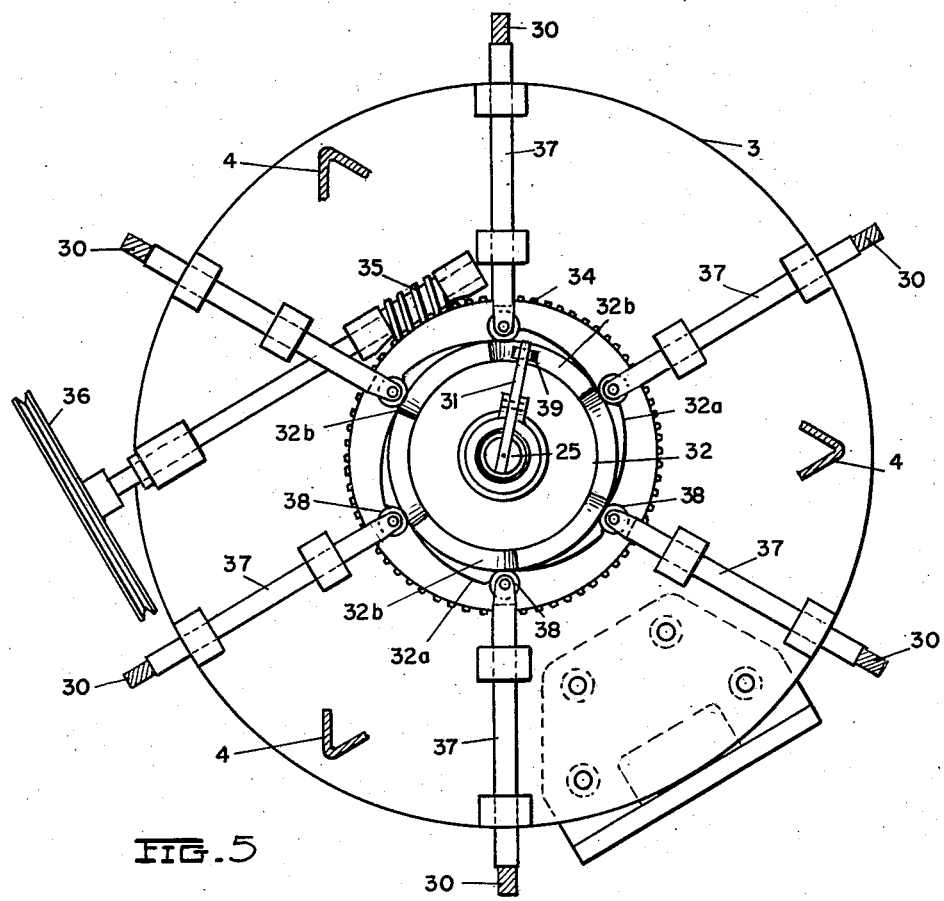
Fig. 5 is a horizontal sectional view looking upwardly, as indicated by the line 5—5, Fig. 2.
Figure 6:
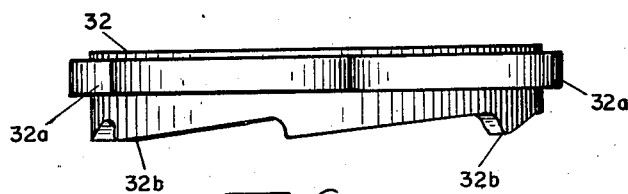
Fig. 6 is a side elevation of a rotary cam which forms an element of the machine.

For the purpose of actuating these several rocker arms 30 and 31 and thereby advancing the associated drill-carrying spindles, a rotary cam 32 having the form best shown in Figs. 5 and 6 is mounted on the under side of said plate 3. This cam is thus mounted on a tubular bearing 33 which at the same time provides a bearing for the lower end of the vertically disposed drill-carrying spindle 25. Said cam is rotated by means of a worm gear 34 affixed thereto and a worm 35 meshing with such gear and driven through a shaft 36 from an independent source of power, i. e. a source other than the motor which drives the several drill-carrying spindles. The cam 32 is provided on its edge with a series of radially projecting cam elements 32a, six in number to correspond with the rockers 30, which latter are periodically simultaneously actuated by means of pusher bars 37, provided at their inner ends with rollers 38 which ride on the edge of the cam and bearing at their outer ends against the lower ends of said rockers 30.

For the purpose of actuating the rocker arm 31 which in turn serves to reciprocate or advance upwardly the vertical drill-carrying spindle 25, cam 32 is provided on its under face with a series of cam elements 32b disposed to engage a roller 39 on the outer end of said rocker 31.

As a result of the construction of the aforesaid cam member and of the means whereby it is connected with the several rockers 30 associated with the radial drill-carrying spindles 12 and with rocker 31 associated with the vertical drill-carrying spindle 25, it will be seen that such spindles may be all advanced simultaneously to the work-piece with such interval in timing between the movement of the vertical drill-carrying spindle and the plurality of radial spindles as may be desired.

In the operation of the machine the spindles will be continuously driven at such rate of speed as is compatible with securing the best results, having regard to the size of the work-piece, the material of which it is composed and the character of the drills employed. The timing of the advance movements of the drills through the operation of the cam 32, as illustrated in Figs. 9 and 10, is such that the several radial drills 13 are advanced simultaneously to points which lie within the hole formed in the end of the head wherewith they ultimately intersect. Simultaneously with such advance of drills 13, drill 26 which forms such central hole is advanced, but withdrawal of drills 13 begins before said drill 26 reaches the holes left by the former. As a result, practically no burring action occurs since drill 26 will cut cleanly across the holes left by drills 13 and the latter likewise will leave no burrs when they enter the respective sides of the workpiece. By simultaneously advancing the radial drill spindles, the drills carried thereby will press substantially equally against all sides of the article. There is thus little tendency for the drills to get out of alignment and strain thereon is minimized.

The machine illustrated and described above, while extremely simple and designed for hand feeding and removal of the screws or other workpieces, is nevertheless capable of rapid and efficient operation. This is due not merely to the arrangement of drills and actuating mechanism therefore whereby the seven holes required in the screw head are drilled practically simultaneously, but also to the means provided for receiving and holding the work-piece itself. It will be understood that the flanged bushing 5 which constitutes the principal work-holding or chucking member is exchangeable for other similar members having recesses 7 therein of different shapes and sizes to fit whatever particular work-piece is to be operated on. When the machine is in use all that the operator is required to do is to insert and remove successive work-pieces and hold down the handled lever 10 during the relatively brief period that the drills are in operation. In order to prevent advance movement of the drills before the work is clamped in position in the chucking member, the driving means for the rotary cam 32 may be made subject by familiar means to the control of the operator or such rotation can be timed to thus advance the drills at suitable intervals which will allow sufficient time for placing and removing the successive work-pieces.

It will be understood that, if desired, in order to more accurately guide the radial drills 13 to the work, a suitable jig (not shown) may be employed.

Figure 11:
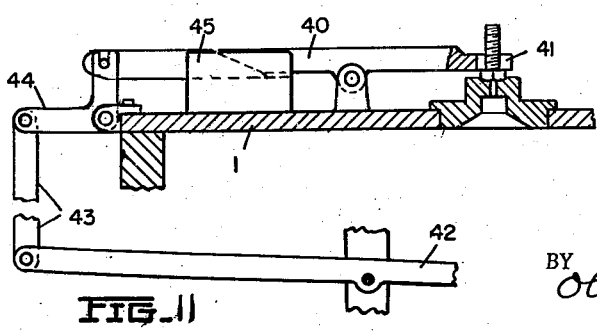
Fig. 11 illustrates a modified construction.

Also, as shown in Fig. 11, other means than the hand-operated lever 10, may be utilized to retain the work in place. In the modified construction of the figure in question the handled lever 10 is replaced by a lever 40 pivotally attached at approximately its mid-point to the top plate 1. The inner end of said lever is provided with a slot 41 which, when such end is depressed, is adapted to engage the bolt head in the same manner as slot 11 in lever 10. Said lever 40 is actuated by means of a treadle 42, suitably mounted in the lower portion of the machine frame and connected with the outer end of the lever through the medium of a link 43, a bell-crank 44 and a beveled slide 45 that rests on the top of plate 1 in line with such lever end. The latter is provided with downwardly directed bevel face opposed to the bevel face of the slide; accordingly when the latter is urged inwardly by actuation of the foot lever 42, the slotted end 41 of lever 40 will be pressed forcibly down on the head of a bolt seated in the chucking member 5.

The foregoing arrangement obviously has the advantage of having both hands of the operator free, so that he can simultaneously feed and remove nuts, thus further expediting the operation of the machine.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In a machine of the character described having means adapted to receive and hold in fixed position an article such as a capstan head screw blank with sides and end accessible for operation and a drill-carrying spindle aligned with the axis of the article thus held and movable towards and from such end of the latter and a plurality of similar spindles radially disposed in a plane transverse of such axis and movable toward and from such sides of the article having means adapted to advance and retract said aligned spindle and means adapted to advance and retract said plural spindles, said advancing and retracting means being timed to clear the center of said article of said plural spindles prior to completion of the advance movement of said aligned spindle, driving means for said spindles comprising a hollow bevel gear rotatable about said axially aligned spindle, radially disposed spindles corresponding with said plural spindles and having bevel pinions meshing with said bevel gear, and spur pinions interconnecting each pair of corresponding spindles.

2. In a machine of the character described, the combination of means adapted to receive and hold in fixed position an article such as a capstan head screw blank with sides and end accessible for operation, a drill-carrying spindle below and aligned with the axis of the article thus held and movable towards and from such end of the latter, a plurality of similar spindles radially disposed in a plane transverse of such axis and movable toward and from such sides of the article, springs normally retracting said spindles, respectively, rocker arms adapted to advance said spindles, respectively, and a cam at the lower end of and rotatable about said axially aligned spindle and having an end face for actuating the rocker for said spindle and a series of edge faces for actuating the rockers for said plural spindles.

3. In a machine of the character described having means adapted to receive and hold in fixed position an article such as a capstan head screw blank with sides and end accessible for operation and a drill-carrying spindle aligned with the axis of the article thus held and movable towards and from such end of the latter and a plurality of similar spindles radially disposed in a plane transverse of such axis and movable toward and from such sides of the article, springs normally retracting said spindles, respectively, rocker arms adapted to advance said spindles, respectively, a rotatable cam below said radially disposed spindles having elements for actuating said rockers, respectively, and driving means for said spindles comprising a hollow bevel gear rotatable about said axially aligned spindle, radially disposed spindles corresponding with said plural spindles and having bevel pinions meshing with said bevel gear, and spur pinions interconnecting each pair of corresponding spindles.

4. In a machine of the character described having means adapted to receive and hold in fixed position an article such as a capstan head screw blank with sides and end accessible for operation and a drill-carrying spindle aligned with the axis of the article thus held and movable towards and from such end of the latter and a plurality of similar spindles radially disposed in a plane transverse of such axis and movable toward and from such sides of the article, springs normally retracting said spindles, respectively, rocker arms adapted to advance said spindles, respectively, a cam below said radially disposed spindles rotatable about said axially aligned spindle and having an end face for actuating the rocker for said spindle and a series of edge faces for actuating the rockers on said plural spindles, and driving means for said spindles comprising a hollow bevel gear rotatable about said axially aligned spindle, radially disposed spindles corresponding with said plural spindles and having bevel pinions meshing with said bevel gear, and spur pinions interconnecting each pair of corresponding spindles.

WILBUR B. BURKE.

(References on following page)

REFERENCES CITED

The following references are of record in the file of this patent:

UNITED STATES PATENTS

| Number | Name | Date |
|---|---|---|
| 593,622 | Tejada | Nov. 16, 1897 |
| 704,178 | Everson | July 8, 1902 |
| 1,306,037 | Trundle | June 10, 1919 |
| 1,610,695 | McKee | Dec. 14, 1926 |
| 1,616,150 | Teller et al. | Feb. 1, 1927 |
| 1,904,975 | Babcock | Apr. 18, 1933 |
| 2,147,243 | Cornell | Feb. 14, 1939 |
| 2,148,577 | Plott | Feb. 28, 1939 |
| 2,242,169 | Birkigt | May 13, 1941 |

FOREIGN PATENTS

| Number | Country | Date |
|---|---|---|
| 495,605 | Germany | Apr. 9, 1930 |